Jan. 3, 1928.
E. P. GUSTAFSON
1,655,266
ATTACHMENT FOR WINDSHIELD WIPERS
Filed March 31, 1927
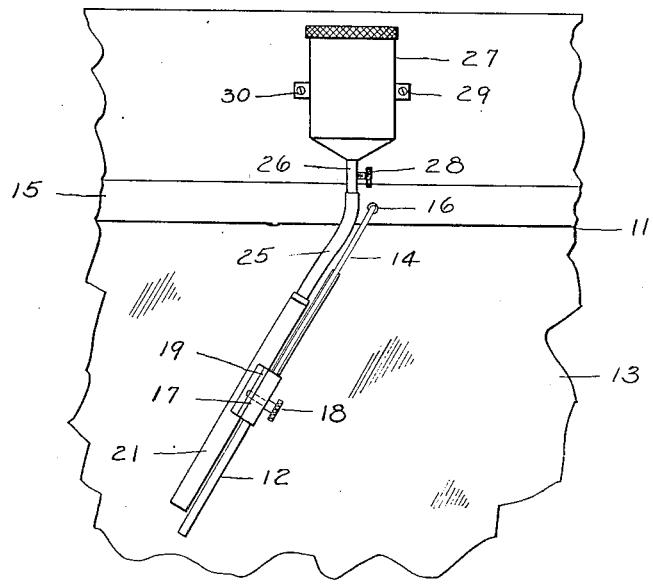
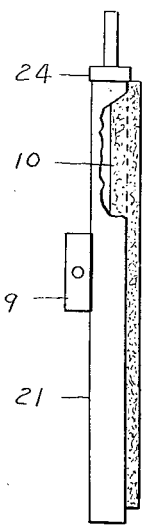
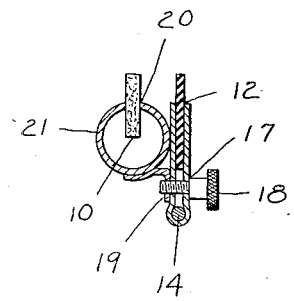
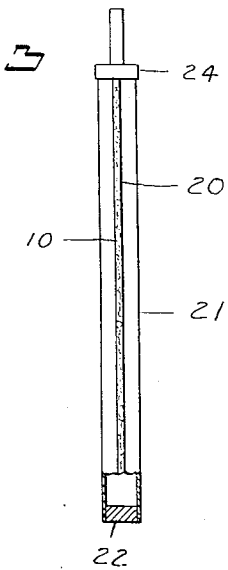
Inventor:
Edwin P. Gustafson,
Louis M. Schmidt
Atty.

Patented Jan. 3, 1928.

1,655,266

UNITED STATES PATENT OFFICE.

EDWIN P. GUSTAFSON, OF FORESTVILLE, CONNECTICUT.

ATTACHMENT FOR WINDSHIELD WIPERS.

Application filed March 31, 1927. Serial No. 179,740.

My invention relates to improvements in attachments for windshield wipers in the form of a device that is incorporated with the structure of a windshield wiper of the automatically or hand driven type in common use and that serves as means for the delivery of an anti-freezing mixture or the like to the surface of the glass of the windshield in a manner such as to be distributed about and spread over the portion of the surface that is wiped by the contacting element of said wiper, and the object of my improvement is to produce a device that by reason of the use of distributing member of felt or the like that is saturated with a suitable liquid or solution serves to deliver such liquid or solution in close proximity to said contacting element is adapted to supply the necessary amount of the liquid or solution and without flooding, and that, furthermore, is provided with storage means and connecting tubing or the like for maintaining a suitable supply of the liquid or solution.

Figure 1 is a front elevation of a portion of a windshield structure of an automobile that is equipped with a wiper blade structure of the automatically driven type and with which is incorporated an attachment embodying my invention for the storage and delivery of liquid to the face of the glass.

Figure 2 is a side view of the liquid delivery member, being in part broken away.

Figure 3 is a front edge view of the same, the lower portion of the slitted tubing and felt delivery part being broken away, showing the plugged bottom end.

Figure 4 is a sectional view through the supporting bracket and adjacent parts.

My improved attachment for windshield wipers comprises a liquid delivery member 10 in the form of a strip of felt or the like that is applied to the face of the glass of a windshield 11 for the purpose of delivering thereto a limited or more or less regulated quantity of liquid or solution such as may be well known and having the character of providing a coating or film for said face such as to prevent freezing and the coating with ice such as to obstruct the vision.

In the present instance said delivery member 10 is moved back and forth with the wiper blade 12 of the wiper as shown and for this reason is mechanically associated therewith, as will be described.

The blade 12 is of common form, having a contacting element for contacting with the glass 13 of rubber, and is operatively supported and driven by means of a swinging arm 14 that is in pendant relation to the sash member 15 of the windshield 11, the pivotal point of such swinging movement being identified by the opening 16 in said sash member 15.

The blade 12 is secured to the driving arm 14 in any proper manner, as by means of a clamp 17 that is held in the holding condition by means of the knurled-headed screw 18.

In the present instance the screw 18 is utilized for holding the delivery member 10 in association with the wiper blade 12 through the medium of a perforated lug 19 and connected parts.

The liquid delivery member 10 is in the form of an elongated strip of felt and is operatively supported by being pinched between the border edges of the side walls of a slot 20 in a correspondingly elongated tubular structure 21.

The tubular structure 21 serves as the delivery means or confining means for the liquid, such as alcohol or the like that is delivered to the delivery member 10, the latter making contact with the glass generally after the manner of the blade 12. The term confining means is applicable for the condition generally when in use, rather than such a term as liquid holding means, because only enough liquid is delivered preferably such as can be soaked up or absorbed by the delivery felt member 10, there being no surplusage of the liquid.

The lower end of the tubular structure 21 is closed by means of a plug 22 and the upper end thereof is provided with a fitting 24 that terminates in the form of a reduced tubular stem that is adapted to have slipped thereover one end of a delivery tube 25 of rubber, such as to provide flexibility.

The upper end of the rubber tube 25 is connected to the delivery stem 26 of a liquid storage tank 27, said stem 26 being provided with a control cock 28.

The tank 25 is supported in a relatively elevated position in any proper manner, as by means of supporting lugs 29 having holes 30 for supporting screws.

The cock 28 is preferably adjusted as to the amount of opening so as to admit to the delivery system described only a relatively limited supply of liquid, as by drops rather than a continuous flow, even at the full opening. Thus even in the hands of an unskilled operator there will be no danger of a flooding delivery or flow of liquid.

I claim as my invention:—

An attachment for a windshield wiper that is supported for being swung back and forth over a portion of the face of the glass of a windshield for the delivery of anti-freezing liquid to said face of the glass, comprising an absorbent spreader, a hollow member embracing an edge of said spreader, a liquid storage tank, means for delivering liquid from said tank to said hollow member, and means for attaching said hollow member to the wiper blade.

EDWIN P. GUSTAFSON.